Patented Aug. 22, 1939

2,170,127

UNITED STATES PATENT OFFICE 2,170,127

N-LOWER-DIALKYL-COUMARIN-3-CARBONYLAMIDES AND PROCESS OF PRODUCING THEM

Otto Dalmer and Fritz von Werder, Darmstadt, Germany, assignors to Merck & Co. Inc., Rahway, N. J., a corporation of New Jersey No Drawing. Application February 26, 1937, Serial No. 127,914. In Germany March 13, 1936

8 Claims. (Cl. 260—344)

This invention relates to certain N-lower-dialkyl-coumarin-3-carbonylamides, suitable for therapeutic use, having the following general formula:

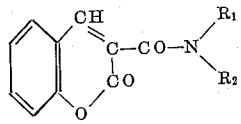

where $R_1$ and $R_2$ are lower alkyl radicals.

We have found that amides of coumarin-3-carboxylic acid disubstituted on N by lower aliphatic hydrocarbon radicals, exhibit remarkable sedative properties, and are particularly distinguished by their slight narcotic properties and wide therapeutic latitude, i. e., slight toxicity.

It is particularly interesting to find that these hitherto unknown dialkyl-substituted amides of coumarin-3-carboxylic acid exhibit such favorable therapeutic properties, because the known mono-alkylated and aryl-alkyl substituted amides of this acid do not exhibit a sedative action which would render them suitable for therapeutic use.

The new dialkylamides of coumarin-3-carboxylic acid (alkyl meaning lower alkyl, and especially methyl and ethyl) may be produced by conversion of the coumarin-carboxylic acid into the desired amides. Also, the oxygen ring of coumarin carboxylic acid may be obtained by a process analogous to the Knoevenagel synthesis, by treatment with compounds which contain the di-substituted acid-amide group already preformed on the N atom. Thus, it is preferable to treat the coumarin-3-carboxylic acid chloride with lower dialkyl-amines in which case the reaction proceeds according to the following scheme:

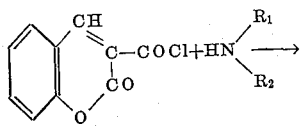

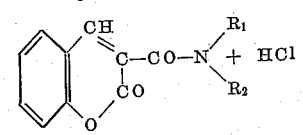

where $R_1$ and $R_2$ are lower alkyl radicals, or to heat salicylaldehyde with N-tetra-alkylated malonic acid amide (alkyl meaning lower alkyl).

In carrying out this last-mentioned reaction, we have found that it is not necessary to use pure N-tetra-alkylated malonic acid amides which are not easily obtainable, but that the synthesis may be carried out with the crude material obtained by the preparation of the amides mentioned. The condensation process does not have to be carried out in the presence of basic catalysts like piperidine, for example, such as are required in the Knoevenagel synthesis.

The processes for the production of the new amides are set forth in detail in the accompanying examples. Obviously, these examples may be modified considerably with respect to their order and number and the specific materials used, without departing from the spirit of the invention substantially as described and claimed, and it is understood that we do not desire to limit ourselves strictly to the specific embodiments shown.

Examples

1. An aqueous solution of about 15.8 parts by weight of dimethylamino-hydrochloride is treated with about 21 parts by weight of caustic soda. The base is freed and taken up in about 50 parts by volume of cooled dry benzol. A solution of 20.8 parts by weight of coumarin-3-carboxylic acid chloride in 800 parts by volume of dry benzol is slowly added to the benzol solution of dimethylamino solution cooled with ice water. The mixture is allowed to stand for 2 hours at room temperature. It is then refluxed for about one hour at 30°; then for about one hour at 40°; then for about another hour at 50°, and, finally, it is heated to the boiling point for about 3 hours. The solvent is distilled off in vacuo, and the residue recrystallized twice from 50% alcohol. About 19 parts by weight of coumarin-3-carboxylic acid dimethylamide are obtained. It occurs in the form of colorless needles, melting at about 144–145° and has the following formula.

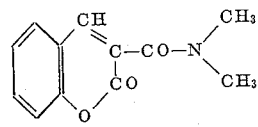

2. A lukewarm solution of 208.5 parts by weight of courmarin-3-carboxylic acid chloride in 5000 parts by volume of benzol is slowly added to a cooled solution of 150 parts by weight of diethylamine in 900 parts by volume of dry benzol. The mixture is heated to boiling, with refluxing, for about 4 hours. The benzol is distilled off in vacuo, and the residue extracted several times with dry ether. About 98.2 parts by weight of dimethylaminohydrochloride remain which, after processing, may be extracted again. The combined ether extracts are concentrated to a small volume. The diethylamide of coumarin-3-carboxylic acid separates in needles and is filtered off by suction. It is washed with a small amount of ether, mixed with about 1500 parts of cold water and stirred. It is filtered off by suction and washed with about 750 parts of water. It is dried in vacuo at 40°. It has a melting point of about 77° and the following formula:

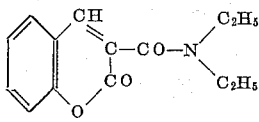

3. About 33 parts by weight of coumarin-3-carboxylic acid chloride and 19 parts by weight of methyl-ethylamine are treated in benzol solution in accordance with the steps of Example 2. The raw product, crystallized out of the ether solution is recrystallized from 40% alcohol and is obtained in the form of colorless needles. It has a melting point of about 108–109° and the following formula:

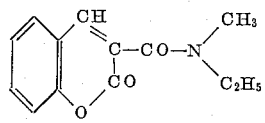

In the same manner, coumarin-3-carboxylic acid methyl-propyl amide is prepared from coumarin-3-carboxylic acid chloride and methyl-propyl-amide (melting-point of about 109–110° C.) and the following formula:

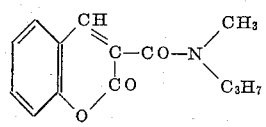

4. About 37 parts of malonic acid bisdimethyl-amide (obtained by mixing malonic ester with an aqueous solution of dimethylamine) and 29 parts of salicylaldehyde are heated in an oil bath to 145°. At this temperature, a brisk reaction sets in, with ebullition. After the reaction has subsided, the temperature is maintained at 150° for a short period, after which the substance is then cooled. The crystallizing reaction product is covered with a small amount of alcohol, and later is thoroughly kneaded. The crude product is then filtered off by suction, washed with a small amount of cooled alcohol, and purified by recrystallization from 50% alcohol. The coumarin-3-carboxylic acid dimethylamide precipitates in long colorless needles having a melting point of about 144–145°.

We claim as our invention:

1. An N-lower dialkyl-coumarin-3-carbonyl-amide.
2. Coumarin-3-carboxylic acid dimethylamide.
3. Coumarin-3-carboxylic acid diethyl amide.
4. Coumarin-3-carboxylic acid methyl-propyl amide.
5. The process for the production of N-lower dialkyl coumarin-3-carbonylamides, which comprises heating the coumarin-3-carboxylic acid chloride with the corresponding amine, in dry benzol.
6. The process for the production of dimethyl-substituted amides of coumarin-3-carboxylic acid which comprises heating dimethylamine with coumarin-3-carboxylic acid chloride, in dry benzol.
7. The process for the production of coumarin-3-carboxylic acid di-ethyl amide which comprises heating the coumarin-3-carboxylic acid chloride with di-ethyl amine, in dry benzol.
8. Process for the production of coumarin-3-carboxylic acid methyl-propyl amide comprising heating coumarin-3-carboxylic acid chloride with methyl-propyl amine.

OTTO DALMER.
FRITZ VON WERDER.